United States Patent [19]

Smith et al.

[11] Patent Number: 4,666,211
[45] Date of Patent: May 19, 1987

[54] MULTI-LEVEL TRANSPORT TRUCK APPARATUS

[76] Inventors: Gavin C. Smith; Gregory C. Smith; Flynn K. Smith, all of 33 Beverly Garden Dr., Metairie, La. 70001

[21] Appl. No.: 722,444

[22] Filed: Apr. 12, 1985

[51] Int. Cl.⁴ .............................................. B60P 1/28
[52] U.S. Cl. .................................... 298/8 R; 105/370; 296/24 R; 296/184
[58] Field of Search ............ 298/8 R; 296/24 R, 37.6, 296/184; 105/370, 371, 375

[56] References Cited

U.S. PATENT DOCUMENTS

| | | | |
|---|---|---|---|
| 2,246,728 | 6/1941 | Gordon | 296/24 R |
| 2,603,168 | 7/1952 | Edwards | 105/370 |
| 3,378,302 | 4/1968 | Doeglas et al. | 298/8 R |
| 4,094,546 | 6/1978 | Glassmeyer et al. | 296/24 R X |

FOREIGN PATENT DOCUMENTS 642229 1/1979 U.S.S.R. .............................. 298/8 R

Primary Examiner—Leslie J. Paperner

[57] ABSTRACT

A multi-level transport truck apparatus, particularly suitable for use with trucks that release contents through rearward tilting of the container portion, having a main container portion divided into at least upper and lower container portions by plate members insertable within u-shaped channels within the main container and defining seperate container spaces. There is further provided rear door members corresponding to each of the container spaces for selectively dumping the contents of each of the spaces depending if the doors are secured or unsecured. Further, there are identification tags on each door member indicating the contents of each container space, with each tag removeable as the contents of the space is changed.

3 Claims, 4 Drawing Figures

MULTI-LEVEL TRANSPORT TRUCK APPARATUS

BACKGROUND OF THE INVENTION

1. Field of the Invention

The present invention relates to transport trucks. More particularly, the present invention relates to a truck having a multi-level transport section wherein a plurality of different materials can be transported seperate and apart from one another and removed selectively as needed.

2. General Background

At present, transport vehicles, such as "dump trucks" are able to deliver a significant load of materials to be transported. However, most types of vehicles have a rear section for retaining a single load, such as rocks, sand, or cement. If the materials are to be transported, then each requires a seperate "load". Therefore, there is presently a need for a multileveled transport truck or vehicle wherein the load-carrying portion can be partitioned off so that a plurality of different goods can be transported in the same load, yet maintained in individual load spaces. If, therefore, there is a need to transport certain quantities of seperate items, the vehicle load space could easily be adapted to suitably transport each through the use of the present invention.

SUMMARY OF THE PRESENT INVENTION

The present invention solves the problems in the present state of the art in a simple and straight-forward manner. What is provided is a truck or other vehicle, particularly the type of "dump" truck wherein the load area tilts rearward to release its contents. The rear load-containing compartment, is generally defined by side walls, a floor portion and an open top portion, with the rearward most wall hinged for releasing the contents; There is further provided a plurality of track members along the side parallel walls wherein a metal plate could be slid into place along the track, the plate being substantially the same width as the span between the sidewalls and depth of the container space, so that once slid in position provides a "second" floor within the container space, thus provided a seperate load area on each floor plate, depending on the number of plates inserted therein. There is further provided a plurality of individual door members for each space created between floors, the door members being hingedly engaged so that upon tilting of the container area, only those contents would be selectively released from a particular space depending on which door has been released for opening. Further, the invention includes means for identifying preferably on each rear door the contents contained in that particular space, the identifying means changeable depending upon the contents contained therein.

It is an object of the present invention to provide a multi-level transport container truck;

It is a further object to provide a container for dump trucks having seperate and individual container portions;

It is a further object to provide a container for dump trucks wherein each space is releasable seperate from other container spaces;

It is a further object of the present invention to provide means of selectively identifying the contents of each space.

DETAILED DESCRIPTION OF THE PREFERRED EMBODIMENT

Figure 1:
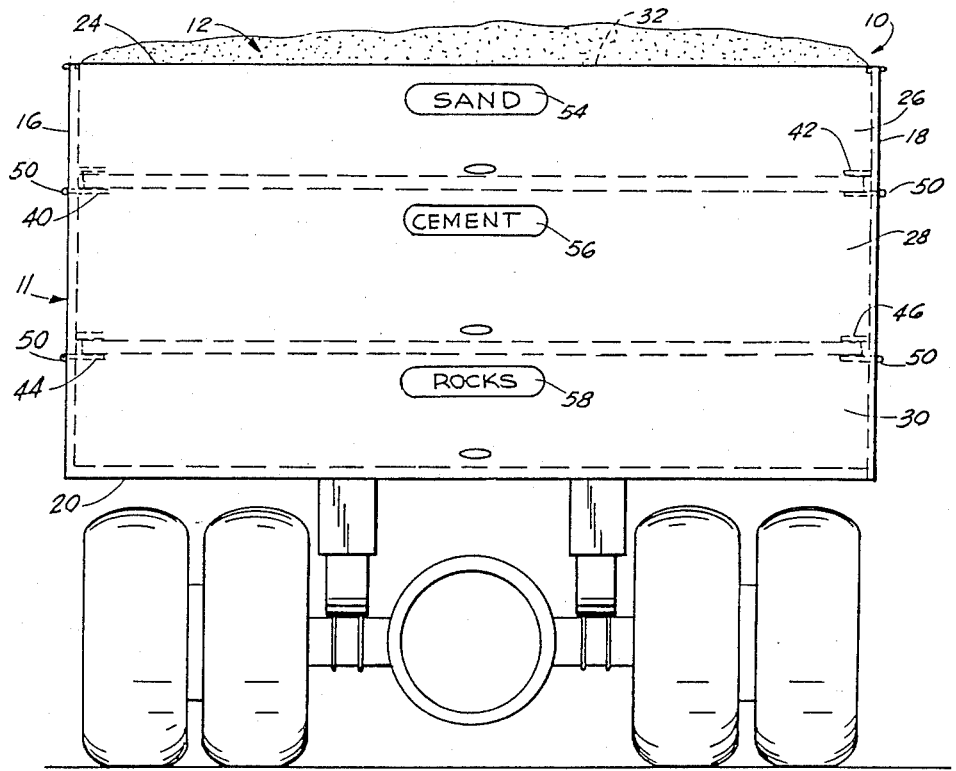
FIG. 1 illustrates a rear view of the preferred embodiment of the present invention.

The preferred embodiment of the present invention is illustrated in FIGS. 1 through 4, generally designated by the numeral 10. In the preferred embodiment, the invention relates to improvements in transport vehicles, particularly to "dump" trucks, defined by having the ability to unload their contents by tilting the container section rearward, until the contents are emptied out through a rearward hinged door. Applying the present invention to this particular type vehicle, although not being restricted to this type, FIG. 1 illustrates a rear view of a dump truck 11 wherein there is provided container portion 12, supported by a plurality of wheel members 14. The container portion 12 is defined by paralled side walls 16 and 18, floor portion 20, a stationary front wall 22 (not seen), an open top portion 24 and a plurality of rear door portions 26, 28, 30 respectively. The unique function of door portions 26, 28, 30 will be discussed further. The side walls 16 and 18, front wall 22, floor portion 20 and rear doors 26, 28, 30 define a container space 32 wherein products are transported.

Figure 2:
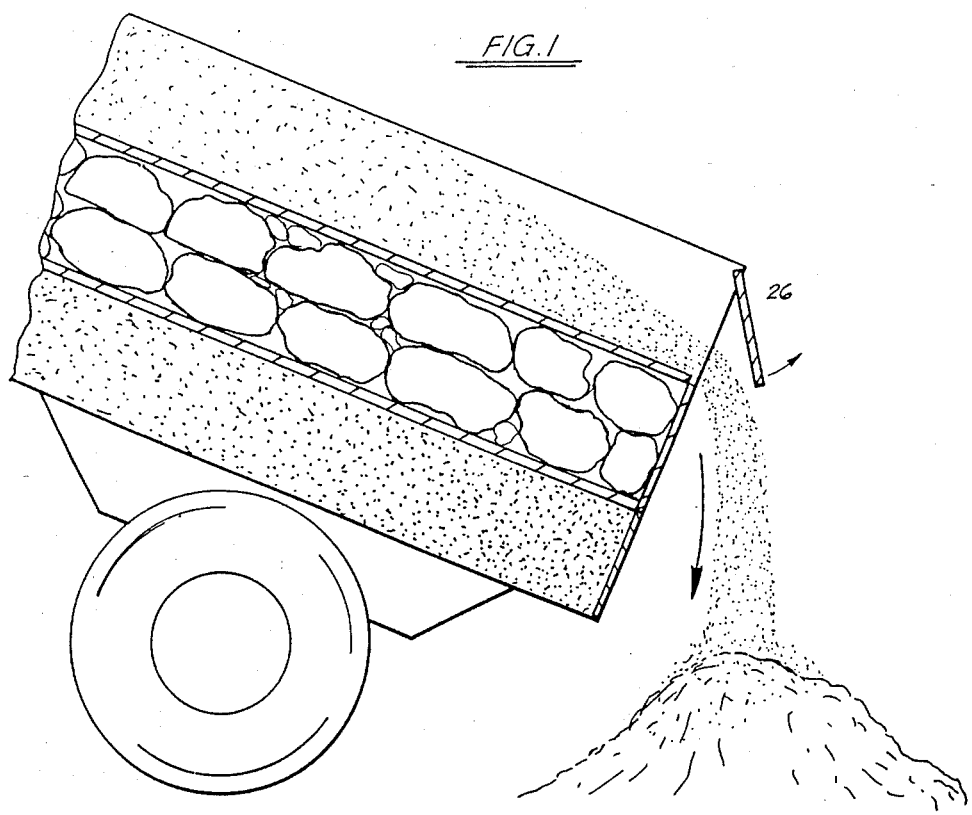
FIG. 2 illustrates a side view of the preferred embodiment of the present invention wherein contents are selectively removed therefrom.
Figure 3:
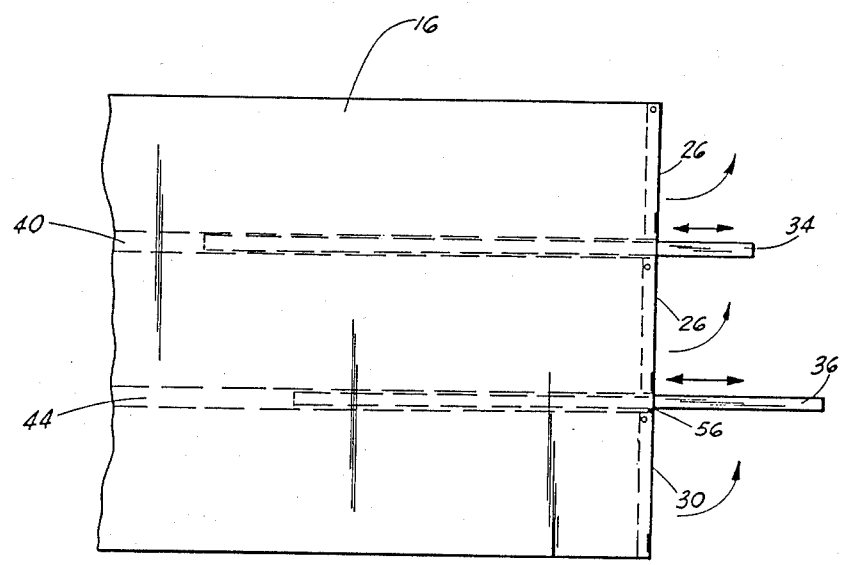
FIG. 3 is a side partial view of the preferred embodiment of the present invention illlustrating in partial view the insertable partition members.
Figure 4:
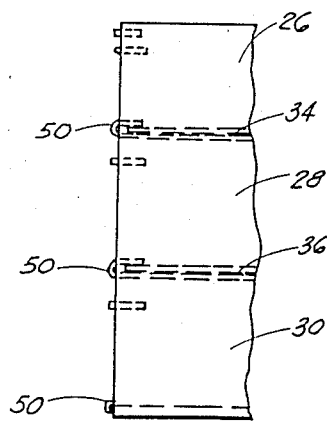
FIG. 4 illustrates a rear view of the present invention with the lock means seen in partial view.

FIG. 1, together with FIGS. 2 through 4, further illustrate that container space 32 is divided into a plurality of seperate container spaces 32a, 32b, and 32c, respectively defining a mulit-leveled container space 32. As seen in the FIGURES, each container space 32a, 32b, and 32c is formed by the placement of a first metal plate or the like 34 and a second metal plate 36, each metal plate 34 and 36 placed substantially in position in space 32 to divide space 32 in three equal spaces 32a, 32b and 32c. In the preferred embodiment, each metal plate 34 and 36 is of substantially the same width and depth as space 32 so that once in position as illustrated in FIG. 2, provide a second and third floor portion of each space 32a and 32b respectively.

FIGS. 1 through 4 further illustrate the manner in which metal plates 34 and 36 are allowed to be placed and maintained in position along side walls 16 and 18 in space 32. As illustrated in the FIGURES, there is provided a pair of parallel preferably "u" shaped channel members 40 and 42 rigidly attached along each side wall 16 and 18 respectively for slidably accomodating metal plate 34 thereinto, allowing the placement and the removal of metal plate easily. Likewise, there is provided a second pair of parallel "u" shaped channels 44 and 46 for accomodating metal plate member 36 in a likewise fashion. Once slid into position, plate members 34 and 36 serve to divide overall container space 32 in the three spaces 32a, 32b and 32c as discussed earlier. In the preferred embodiment, "u" shaped channels 40, 42, 44, 46 are maintained in rigid connection to side walls 16 and 18 through welding, bolting, or the like, most importantly, being of such thickness and rigidity to rigidly support plate members 34 and 36 when they are needed to bear the weight loads of sand, gravel, cement or the like. Also, although only two partitions 34 and 36 are illustrated in the preferred embodiment, if one wished, one could place a number of partition members, having a likewise equal number of rear door members in order to operate as in the preferred embodiment. As illustrated in the FIGURES, since when in position, partitions 34 and 36 would define three seperate spaces 32a, 32b, and 32c, rear door members further provide for three door members, 26, 28, 30 respectively, each cooresponding to an access means to the respective space 32a, 32b, and 32c. As seen, particularly in FIG. 1, each door member is hinged to wall portions 16 and 18 at the top portions thereof, basically being a standard free-swinging hinge, and upon release of a lock members 50 at the bottom of each door, the door is allowed to swing open when force is placed thereupon from inside each space 32a, 32b or 32c. Of course, when used on a dump truck, upon the container portion 12 tilting rearward, the door or doors which are unsecured, as will be discussed further, will swing open and allow the contents to spill out onto the ground or the like.

In the preferred embodiment there is further provided means for identifying the contents of each container space 32a, 32b or 32c. This identification means 52 further comprises a plurality of identification tags 54, 56, 58, each tag adhered to the exterior of each rear door 26, 28, 30 respectively, and as seen in FIG. 1, each tag identifying, in written word, the contents of each space. For purposes of description, FIG. 1 illustrates that each space 32a, 32b, 32c contain sand, cement and rocks respectively as seen on tags 54, 56, 58. Each tag would preferably be easily removable so that when the contents would be changed, the identification tag could be likewise changed to reflect the contents.

FIG. 2, in particular, illustrates the present invention in operation. As seen in FIG. 2, in side cutaway view, there is illustrated container space 32 partitioned off by partition members 34 and 36 having been slid into position, as illustrated in FIG. 3, and therefore defining three seperate container spaces 32a, 32b, 32c. Contained in each space, for purposes of iullustration, are sand, bags of cement and rocks respectively. Of course, in the loading of the contents, the rocks contained in the lowermost space would be loaded first, and partition 34 slid into position, the second space loaded with bags of cement, then partition 36 slid into place, and the third and most upper space filled with sand. The partitions, as seen in the FIGURES, maintain the contents in three distinct portions, seperate and apart, while also allowing transport of multiple loads. In FIG. 2, when the contents are ready to be unloaded, for example, the sand contained in the upper most portion, door 26 would be unlocked, and doors 28, 30 would be maintained secured. Therefore, upon tilting of container portion 12, only the upper load is dumped from container space 32c and the contents in 32b and 32a remain therewithin.

So that plate members are unable to slide out of the "u" shaped channels when dumping is occuring, each channel further provides a rear raised lip portion 56, so that plate member is slid into position, and upon being seated totally within "u" shaped channel, must be raised initially to clear lip portion 56 in order to be manually removed. It should be noted that the present invention could be accomodated to be used with present dump trucks through a minor modification process. Also, a greater number of container sections could be utilized depending on the need, and with all partitions removed, the entire container space 32 could be utilized for a single load.

Because many varying and different embodiments may be made within the scope of the present inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A multi-level transport truck apparatus, particularly suitable for use with trucks that carry bulk materials which are not contained in individual containers, such as gravel, sand, rock or dirt and release their contents through rearward tilting of the container portion, said apparatus comprising:
   a. a main container portion, defined by side walls, and a floor portion;
   b. a solid metal plate member slidably insertable between said side walls in said container portion for dividing the main container portion into a first lower container section and a second upper container section, the metal plate insertable between the side walls following the placement of the materials to be transported into the floor portion of the main container portion so that once in position, a second floor portion is defined;
   c. channel members secured to the inner side of said side walls for slidably accommodating said metal plate inserted thereinto, the channel members securing the metal plate in position allowing the placement of additional materials onto the metal plate as a newly defined floor portion;
   d. a pair of door members attachable to the rear end of said container portion, each door member with said side walls and floor portion providing a confined single compartment container space for contents contained in each upper and lower sections for providing selective removal of contents from each of said upper and lower container sections upon sufficient tilting of said main container portion; and
   e. removable identification tags secured to each of the exterior faces of each of said door member for indicating the contents of each of said upper and lower container sections.

2. The apparatus in claim 1, wherein there is further provided additional channel members for accommodating additional metal plates insertable into said main container portion for seperating said main container portion into a desired plurality of storage sections.

3. The apparatus in claim 1, wherein there is further provided additional door members attachable to said rear portion so that each of the desired container sections is provided with a seperate door member.

* * * * *